United States Patent
Kang et al.

(10) Patent No.: US 11,807,696 B2
(45) Date of Patent: Nov. 7, 2023

(54) METHOD FOR PRODUCING DICYCLOPENTADIENE-BASED RESIN

(71) Applicant: HANWHA SOLUTIONS CORPORATION, Seoul (KR)

(72) Inventors: Hyeonuk Kang, Daejeon (KR); Pilje Seong, Daejeon (KR); Kyongjun Yoon, Daejeon (KR); Min Ho Lee, Daejeon (KR); Heejin Jang, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 398 days.

(21) Appl. No.: 16/973,509

(22) PCT Filed: May 14, 2019

(86) PCT No.: PCT/KR2019/005767
§ 371 (c)(1),
(2) Date: Dec. 9, 2020

(87) PCT Pub. No.: WO2019/240386
PCT Pub. Date: Dec. 19, 2019

(65) Prior Publication Data
US 2021/0246231 A1    Aug. 12, 2021

(30) Foreign Application Priority Data
Jun. 11, 2018  (KR) .................. 10-2018-0066679

(51) Int. Cl.
*C08F 2/01* (2006.01)
*C08F 232/08* (2006.01)

(52) U.S. Cl.
CPC .............. *C08F 2/01* (2013.01); *C08F 232/08* (2013.01); *C08F 2500/02* (2013.01); *C08F 2500/25* (2013.01)

(58) Field of Classification Search
USPC .................................................. 526/65, 283
See application file for complete search history.

(56) References Cited

U.S. PATENT DOCUMENTS

| | | | | |
|---|---|---|---|---|
| 5,410,004 | A | * | 4/1995 | Williams ............. C09D 11/108 526/225 |
| 5,502,140 | A | | 3/1996 | Daughenbaugh |
| 5,571,867 | A | * | 11/1996 | Luvinh .................... C08F 8/04 525/99 |

FOREIGN PATENT DOCUMENTS

| | | |
|---|---|---|
| CN | 105985282 A | 10/2016 |
| JP | S6320310 A | 1/1988 |
| JP | 07086132 B2 | 9/1995 |
| JP | H0786132 B2 | 9/1995 |
| JP | H08208763 A | 8/1996 |
| JP | 2004238430 A | 8/2004 |
| KR | 100354307 B1 | 12/2002 |
| KR | 100362002 B1 | 2/2003 |
| KR | 20140126175 A | 10/2014 |
| TW | 336237 A | 7/1998 |

OTHER PUBLICATIONS

Notice of Allowance issued by Korea Patent Office.
Office Action issued by Korea Patent Office.
1st Office Action issued by Taiwan Patent Office.
2nd Office Action issued by Taiwan Patent Office.
International Search Report dated Aug. 14, 2019.
KR NOA dated Jan. 13, 2022.
JP Office Action dated Feb. 2, 2002.

* cited by examiner

*Primary Examiner* — Fred M Teskin
(74) *Attorney, Agent, or Firm* — Harvest IP Law, LLP

(57) ABSTRACT

The present invention relates to a method for producing a dicyclopentadiene-based resin and a dicyclopentadiene-based resin produced thereby, the method comprising thermal polymerizing under non-catalyst, non-initiator conditions, thereby enabling not only excellent yield, but also, by a low polydispersity index, a narrow molecular weight distribution and the realization of uniform physical properties.

9 Claims, No Drawings

METHOD FOR PRODUCING DICYCLOPENTADIENE-BASED RESIN

CROSS REFERENCE TO RELATED APPLICATIONS

This application is a National Stage of International Application No. PCT/KR2019/005767 filed May 14, 2019, claiming priority based on Korean Patent Application No. 10-2018-0066679 filed Jun. 11, 2018.

TECHNICAL FIELD

The present invention relates to a method for producing a dicyclopentadiene-based resin having uniform physical properties due to a narrow molecular weight distribution caused by a low polydispersity index.

BACKGROUND ART

A dicyclopentadiene (DCPD) resin is mixed with various polymers such as an amorphous polyalphaolefin (APAO), an ethylene vinyl acetate (EVA), and styrenic block copolymers (SBCs), and is used as a tackifier resin for a tackifier or an adhesive through hydrogenation. In this case, various physical properties are required depending on the type and use of a tackifier or an adhesive, and research and development for improving a compatibility with polymers and adhesion have been actively conducted in order to satisfy these requirements.

A dicyclopentadiene resin produced by heating in the presence of a catalyst may cause various corrosion problems during hydrogenation due to the catalyst. In addition, the dicyclopentadiene-based resin thus produced has disadvantages in that an activity of a hydrogenation catalyst is lowered and hydrogenation is not smoothly performed due to a metal of a polymerization catalyst. Further, the dicyclopentadiene-based resin thus produced has significantly low productivity due to low yield.

In order to solve the above described problems, it has been attempted to perform thermal polymerization without using a catalyst, and as a result, polymerization is performed under ordinary non-catalyst and non-initiator conditions, thereby improving yield and solving the problems of residual metals. However, a molecular weight distribution of a dicyclopentadiene-based resin is not uniform, and thus physical properties thereof are not constant.

DISCLOSURE

Technical Problem

In order to solve the problems as described above, the present inventors have conducted an extensive study on a method for producing a dicyclopentadiene-based resin having not only excellent yield but also uniform physical properties due to a narrow molecular weight distribution, and thus the present invention has been completed.

An object of the present invention is to provide a method for producing a dicyclopentadiene-based resin capable of preventing surface contamination such as a release of low molecular weight organic substances even after hydrogenation.

Another object of the present invention is to provide a method for producing a dicyclopentadiene-based resin containing a $C_2$-$C_{20}$ olefin-based monomer or $C_2$-$C_{20}$ olefin-based monomer and an aromatic vinyl-based monomer as a comonomer to have high compatibility and having improved adhesion after hydrogenation.

Technical Solution

In one general aspect, a method for producing a dicyclopentadiene-based resin includes: a) a primary thermal polymerization step of thermally polymerizing a monomer composition in a continuous stirred tank reactor (CSTR) under non-catalytic conditions, the monomer composition containing a mixed monomer of dicyclopentadiene and a $C_2$-$C_{20}$ olefin-based monomer, or a mixed monomer of dicyclopentadiene, a $C_2$-$C_{20}$ olefin-based monomer, and an aromatic vinyl-based monomer; and b) a secondary thermal polymerization step of thermally polymerizing a reaction product obtained by the primary thermal polymerization in a plug flow reactor (PFR) under non-catalytic conditions.

The mixed monomer of the dicyclopentadiene and the $C_2$-$C_{20}$ olefin-based monomer may include the dicyclopentadiene and the $C_2$-$C_{20}$ olefin-based monomer in a weight ratio of 50:50 to 99:1.

The olefin-based monomer may be any one or a mixture of two or more selected from the group consisting of piperylene, isoprene, ethylene, propylene, 1-butene, 1-pentene, 1-hexene, 1-heptene, 1-octene, 1-decene, 1-undecene, 1-dodecene, 1-tetradecene, 1-hexadecene, and mixed C5 fractions.

The aromatic vinyl-based monomer may be any one or a mixture of two or more selected from the group consisting of styrene, alpha-methylstyrene, para-methylstyrene, indene, methyl indene, vinyltoluene, mixed C9 fractions, and derivatives thereof.

A reaction temperature ($T_1$) in the step a) may be 210 to 270° C., and a reaction temperature ($T_2$) in the step b) may be 180 to 300° C.

A reaction time in the step a) may be 10 to 180 minutes, and a reaction time in the step b) may be 10 to 360 minutes.

The dicyclopentadiene-based resin may have a polydispersity index (PDI) of 2.5 or less.

The method may further include, after the step b), performing a hydrogenation process.

In another general aspect, there is provided a dicyclopentadiene-based resin obtained by thermally polymerizing a monomer composition containing a mixed monomer of a dicyclopentadiene and a $C_2$-$C_{20}$ olefin-based monomer, or a mixed monomer of a dicyclopentadiene, a $C_2$-$C_{20}$ olefin-based monomer, and an aromatic vinyl-based monomer under non-catalytic and non-initiator conditions.

The dicyclopentadiene-based resin may be produced with continuous polymerization by performing primary thermal polymerization on the monomer composition in the continuous stirred tank reactor (CSTR), and then performing secondary thermal polymerization on the resulting polymer in the plug flow reactor (PFR).

The dicyclopentadiene-based resin may have a number average molecular weight of 200 to 1,200 g/mol, a weight average molecular weight of 250 to 4,000 g/mol, and a Z-average molecular weight (Mz) of 300 to 5,000 g/mol.

The dicyclopentadiene-based resin may have a polydispersity index (PDI) of 2.5 or less.

Advantageous Effects

The method for producing the dicyclopentadiene-based resin according to the present invention may provide the dicyclopentadiene-based resin having excellent molecular weight and a narrow molecular weight distribution during continuous polymerization by thermally polymerizing under non-catalyst and non-initiator conditions to suppress an excessive crosslinking reaction.

In addition, according to the present invention, the dicyclopentadiene-based resin containing a $C_2$-$C_{20}$ olefin-based monomer or $C_2$-$C_{20}$ olefin-based monomer and an aromatic vinyl-based monomer as a comonomer to have high compatibility, having improved adhesion, and having uniform physical properties due to a narrow molecular weight distribution after hydrogenation may be provided.

BEST MODE

Hereinafter, a method for producing a dicyclopentadiene-based resin according to the present invention will be described in more detail with reference to the exemplary embodiments. The following exemplary embodiments are only a reference for describing the present invention in detail, and the present invention is not limited thereto, and may be implemented in various forms.

In addition, all technical terms and scientific terms have the same meanings as those commonly understood by a person skilled in the art to which the present invention pertains unless otherwise defined. The terms used herein are only for effectively describing a certain exemplary embodiment, and not intended to limit the present invention.

The "dicyclopentadiene-based resin" used herein refers to a resin that is polymerized with dicyclopentadiene as a monomer, or polymerized with other monomers, and particularly, refers to a resin polymerized with a monomer composition containing a mixed monomer of a dicyclopentadiene and a $C_2$-$C_{20}$ olefin-based monomer, or a mixed monomer of a dicyclopentadiene, a $C_2$-$C_{20}$ olefin-based monomer, and an aromatic vinyl-based monomer. The "dicyclopentadiene-based resin" also includes hydrogenated resin obtained by hydrogenating the resin.

The term "volume of the reactor" or "internal volume of the reactor" used herein is defined as meaning an effective volume which may be occupied by reactants or fluids in the reactor, unless expressly stated otherwise.

The present invention for achieving the above object relates to a method for producing a non-catalytic and non-initiator thermal polymerization dicyclopentadiene-based resin capable of implementing uniform physical properties, and a dicyclopentadiene-based resin produced from the method.

The present invention will be described in detail as follows.

A method for producing a dicyclopentadiene-based resin according to the present invention includes: a) a primary thermal polymerization step of thermally polymerizing a monomer composition in a continuous stirred tank reactor (CSTR) under non-catalytic and non-initiator conditions, the monomer composition containing a mixed monomer of a dicyclopentadiene and a $C_2$-$C_{20}$ olefin-based monomer, or a mixed monomer of a dicyclopentadiene, a $C_2$-$C_{20}$ olefin-based monomer, and an aromatic vinyl-based monomer; and b) a secondary thermal polymerization step of thermally polymerizing a reaction product obtained by the primary thermal polymerization in a plug flow reactor (PFR) under non-catalytic and non-initiator conditions.

Specifically, the method for producing the dicyclopentadiene-based resin according to the present invention is performed in two steps. A monomer composition not containing a catalyst and an initiator is first subjected to the primary thermal polymerization in the continuous stirred tank reactor (CSTR). Then, a primary polymer produced from the above step is fed into the plug flow reactor (PFR) connected to the continuous stirred tank reactor and subjected to the secondary thermal polymerization to produce a dicyclopentadiene-based resin. Since the dicyclopentadiene-based resin is produced by the polymerization in each step as described above, the dicyclopentadiene-based resin capable of easily controlling the heat of polymerization, having an significantly improved conversion rate or a polymerization rate of a monomer, and uniform physical properties due to a narrow molecular weight distribution may be produced.

Among the conventional methods for producing a dicyclopentadiene-based resin, a non-catalytic thermal polymerization method had a limitation that the molecular weight distribution is typically broad, such that the uniform physical properties of the dicyclopentadiene-based resin are not provided. However, in the present invention, it is possible to provide the dicyclopentadiene-based resin which may be adjusted to have a narrow molecular weight distribution by adopting a process performed in the continuous stirred tank reactor (CSTR) and the plug flow reactor (PFR) as described above, thereby implementing significant effects such as uniform physical properties and prevention of contamination against an increase in implementation due to use for a long period of time when the dicyclopentadiene-based resin is used as an adhesive.

According to an aspect of the present invention, the method for producing the dicyclopentadiene-based resin includes a step of producing a primary polymer by supplying the monomer composition to the continuous stirred tank reactor and performing primary thermal polymerization on the monomer composition while stirring the monomer composition, the monomer composition containing a mixed monomer of a dicyclopentadiene and a $C_2$-$C_{20}$ olefin-based monomer, or a mixed monomer of a dicyclopentadiene, a $C_2$-$C_{20}$ olefin-based monomer, and an aromatic vinyl-based monomer, wherein the polymerization is performed by thermal polymerization alone without the use of any initiator or catalyst.

The terms "non-catalyst" and "non-initiator" used herein are concepts that do not include all of a metal catalyst, a cationic catalyst, or an anionic catalyst which artificially acts as a catalyst, or a peroxide initiator, an azo-based initiator, or a redox catalyst which artificially induces radical polymerization.

According to an aspect of the present invention, the monomer composition includes a mixed monomer of a dicyclopentadiene and a $C_2$-$C_{20}$ olefin-based monomer, or a mixed monomer of a dicyclopentadiene, a $C_2$-$C_{20}$ olefin-based monomer, and an aromatic vinyl-based monomer. More specifically, the monomer composition may further include a solvent in addition to a mixed monomer of a dicyclopentadiene and a $C_2$-$C_{20}$ olefin-based monomer, or a mixed monomer of a dicyclopentadiene, a $C_2$-$C_{20}$ olefin-based monomer, and an aromatic vinyl-based monomer.

According to an aspect of the present invention, specific examples of the $C_2$-$C_{20}$ olefin-based monomer may include any one or a mixture of two or more selected from the group consisting of piperylene, isoprene, ethylene, propylene, 1-butene, 1-pentene, 1-hexene, 1-heptene, 1-octene, 1-decene, 1-undecene, 1-dodecene, 1-tetradecene, 1-hexadecene, and mixed C5 fractions. As examples of the monomer, $C_4$-$C_{10}$ olefin-based monomer may preferably be included. Specific examples of $C_4$-$C_{10}$ olefin-based monomer may include any one or a mixture of two or more selected from the group consisting of piperylene, isoprene, 1-butene, 1-pentene, 1-hexene, 1-heptene, 1-octene, and 1-decene.

The mixed C5 fractions may be composed of a mixture of isoprene, piperylene, cyclopentadiene, 1-pentene, 2-methyl-2-butene and n-pentane. Specifically, the mixed C5 fractions may be composed of 10 to 20 wt % of isoprene, 10 to 20 wt % of piperylene, 0.5 to 1.5 wt % of cyclopentadiene, 2 to 4 wt % of 1-pentene, 1 to 3 wt % of 2-methyl-2-butene, and 25 to 35 wt % of n-pentane. More specifically, most of the C5 fractions used worldwide may be piperylene-concentrated fractions of which piperylene is the main monomer.

According to an aspect of the present invention, the aromatic vinyl-based monomer may preferably be a $C_6$-$C_{20}$ aromatic vinyl-based monomer. Specific examples thereof may include any one or a mixture of two or more selected from the group consisting of styrene, alpha-methylstyrene, para-methylstyrene, indene, methyl indene, vinyltoluene, mixed C9 fractions and derivatives thereof.

The mixed C9 fractions may be composed of a mixture of styrene, vinyltoluene, indene, alpha-methylstyrene, benzene, toluene and xylene (BTX). Specifically, the mixed C9 fractions are may be composed of 10 to 20 wt % of styrene, 10 to 20 wt % of vinyltoluene, 10 to 20 wt % of indene, 1 to 7 wt % of alpha-methylstyrene, and 40 to 60 wt % of xylene.

When the monomer composition is composed of the monomer as described above, it is possible to have a high molecular weight and a low molecular weight distribution with a low softening point and an improved quality, and to implement excellent adhesion. Therefore, the dicyclopentadiene-based resin may be used as an adhesive or a tackifier.

According to an aspect of the present invention, the mixed monomer of the dicyclopentadiene and the $C_2$-$C_{20}$ olefin-based monomer may include the dicyclopentadiene and the $C_2$-$C_{20}$ olefin-based monomer in a weight ratio of 50:50 to 99:1. The weight ratio of the dicyclopentadiene and the $C_2$-$C_{20}$ olefin-based monomer may be preferably 70:30 to 99:1, more preferably 75:25 to 99:1, and still more preferably 80:20 to 99:1. When the dicyclopentadiene-based resin has the above described content, the compatibility with other resins may be improved, and adhesion may be improved while having a narrow molecular weight distribution.

According to an aspect of the present invention, the mixed monomer of the dicyclopentadiene, the $C_2$-$C_{20}$ olefin-based monomer, and the aromatic vinyl-based monomer may include the dicyclopentadiene, and the $C_2$-$C_{20}$ olefin-based monomer and the aromatic vinyl-based monomer, which are comonomers, in a weight ratio of 50:50 to 99:1. The weight ratio of the dicyclopentadiene, and the $C_2$-$C_{20}$ olefin-based monomer and the aromatic vinyl-based monomer, which are comonomers may be preferably 55:45 to 99:1, and more preferably 60:40 to 99:1.

In this case, the weight ratio of the $C_2$-$C_{20}$ olefin-based monomer and the aromatic vinyl-based monomer may be preferably 1:99 to 50:50, and more preferably 10:90 to 50:50.

When the dicyclopentadiene-based resin has the content as described above, side reactions may be suppressed, the polymerization rate may be increased, and excellent adhesion may be implemented due to a narrow molecular weight distribution.

According to an aspect of the present invention, the monomer composition may be used in a dissolved state in a solvent, and the solvent may be those commonly used in the art to which the present invention pertains. Specific examples of the solvent may include, but are not limited to, any one or a mixture of two or more selected from the group consisting of pentane, hexane, heptane, nonane, decane, benzene, toluene and xylene.

According to an aspect of the present invention, the monomer composition may further include additives commonly used in the art to which the present invention pertains, such as an antioxidant and a polymerization inhibitor.

According to an aspect of the present invention, the continuous stirred tank reactor is not particularly limited as long as it is commonly used in the art to which the present invention pertains. Also, the polymerization may be performed together with continuous charging and mixing of the monomer composition in the continuous stirred tank reactor. The monomer composition may be subjected to the primary thermal polymerization in the continuous stirred tank reactor as described above to maintain temperature uniformly when the reaction proceeds, and thus the probability of occurrence of a local hot spot is lowed, thereby having a narrow molecular weight distribution.

According to an aspect of the present invention, a reaction temperature ($T_1$) in the step a) may be 210 to 270° C., and preferably 220 to 270° C. When the polymerization is performed at the reaction temperature as described above, a conversion rate or a polymerization rate of the monomer is excellent, and the generation of side reactions such as a crosslinking reaction is suppressed, such that uniform physical properties may be implemented due to a narrow molecular which is a comonomer weight distribution caused by a low polydispersity index.

According to an aspect of the present invention, a reaction pressure in the step a) may be 1 to 40 bar, preferably 5 to 35 bar, and more preferably 10 to 30 bar. When the polymerization is performed at the reaction pressure as described above, reactivity of the monomer may be increased to within a range at which the risk of safety accidents does not occur.

According to an aspect of the present invention, a reaction time in the step a) may be 10 to 180 minutes, preferably 20 to 150 minutes, and more preferably 30 to 100 minutes. When the polymerization is performed during the reaction time as described above, side reactions by mixing of raw materials may be suppressed and the narrow molecular weight distribution may be provided.

According to an aspect of the present invention, the polymerization may be performed until a monomer conversion rate of the monomer composition in the step a) is 5 to 70%, preferably 10 to 60%, and more preferably 15 to 50%. When the primary thermal polymerization is performed so as to have the conversion rate as described above, the yield of the polymer during the secondary thermal polymerization may be significantly increased and the occurrence of channeling or dead zone may be prevented, thereby improving polymerization efficiency.

According to an aspect of the present invention, the method for preducing the dicyclopentadiene-based resin includes, after the primary thermal polymerization, a step of producing the dicyclopentadiene-based resin by supplying a primary polymer which is subjected to the primary thermal polymerization to the plug flow reactor, and then performing secondary thermal polymerization on the primary polymer without stirring. In this case, the plug flow reactor may be connected to the continuous stirred tank reactor in which the primary thermal polymerization is performed, from which the polymer may be supplied to perform the continuous polymerization.

When the thermal polymerization is performed only in the continuous stirred tank reactor, channeling by fluid containing unreacted materials and products is generated in the reactor to reduce polymerization rate and efficiency, and a polymer having nonuniform physical properties may be produced.

In addition, when the thermal polymerization is performed only in the plug flow reactor, the polymerization is necessarily performed under reaction conditions of high temperature and high pressure, and there is an advantage that the conversion rate of the monomer per unit volume of the reactor is high because the plug flow reactor has no stirring device inside. However, stirring may be insufficient, resulting in occurrence of a local hot spot and side reactions.

The monomer composition according to the present invention is not initially charged into the plug flow reactor and thermally polymerized, and is subjected to the primary thermal polymerization in the continuous stirred tank reactor, followed by secondary thermal polymerization of the reaction product which is polymerized to a certain level. As a result, the occurrence of a local hot spot may be suppressed due to the decrease of the heat of polymerization, and a narrow molecular weight distribution may be obtained, whereby a dicyclopentadiene-based resin having uniform physical properties may be produced.

In addition, according to an aspect of the present invention, it is possible to easily adjust the total volume of the reactor depending on the amount of production required by connecting the plug flow reactor in series with the continuous stirred tank reactor, without increasing the size of the continuous stirred tank reactor in existing facilities, thereby achieving a better economic effect. Further, with the use of the reactor having the configuration as described above according to the present invention, it is possible to more easily control the heat of polymerization and to produce a dicyclopentadiene-based resin having a narrow molecular weight distribution and uniform physical properties.

According to an aspect of the present invention, the plug flow reactor is not particularly limited as long as it is commonly used in the art to which the present invention pertains, and may be connected in series with the continuous stirred tank reactor. Also, continuous polymerization may be performed together with continuous charging of a primary polymer which is subjected to the primary thermal polymerization in the plug flow reactor.

According to an aspect of the present invention, a reaction temperature ($T_2$) in the step b) may be 180 to 300° C., preferably 180 to 290° C., and more preferably 180 to 280° C. More specifically, the reaction temperature ($T_2$) in the step b) may be the reaction temperature ($T_1$) in the step a) ±30° C., preferably the reaction temperature ($T_1$) in the step a) ±20° C., and more preferably the reaction temperature ($T_1$) in the step a) ±10° C. That is, 12 may be $T_1$−30° C. to $T_1$+30° C., preferably $T_1$−20° C. to $T_1$+20° C., and more preferably $T_1$−10° C. to $T_1$+10° C. When the polymerization is performed at the reaction temperature, side reactions may be suppressed and productivity may be increased.

In addition, like the reaction temperatures as described above, the difference in temperature between the step a) and the step b) is adjusted to 10 to 30° C. Thus, a dicyclopentadiene-based resin capable of minimizing the production of an unreacted oligomer, having a high softening point and a narrow molecular weight distribution may be produced.

According to an aspect of the present invention, the reaction pressure in the step b) may be 1 to 40 bar, preferably 5 to 35 bar, and more preferably 10 to 30 bar. When the polymerization is performed at the reaction pressure as described above, the occurrence of dead zone may be suppressed by vaporized monomers within a range at which the risk of safety accidents does not occur.

According to an aspect of the present invention, the reaction time in the step b) may be 10 to 360 minutes, preferably 20 to 240 minutes, and more preferably 30 to 140 minutes. More specifically, the reaction time in the step b) may be 1 to 4 times, preferably 1 to 3 times, and more preferably 1 to 2 times the reaction time in the step a). When the polymerization is performed during the reaction time as described above, side reactions are suppressed, whereby a dicyclopentadiene-based resin having the narrow molecular weight distribution may be produced.

According to an aspect of the present invention, an internal volume of the plug flow reactor may be 1 to 3 times, preferably 1 to 2.5 times, and more preferably 1 to 2 times the internal volume of the continuous stirred tank reactor. When the internal volume of the plug flow reactor has the size as described above with respect to the internal volume of the continuous stirred tank reactor, the control of an initial reaction heat is easy, such that the generation of impurities may be suppressed, and the polymerization efficiency may be increased, and at the same time, uniform physical properties may be implemented by controlling the reaction temperature.

According to an aspect of the present invention, the plug flow reactor may be connected in series with static mixers, which are any one or two or more selected from the group consisting of a kenics mixer and a sulzer mixer. The mixers as described above may be included to prevent the pressure drop in the reactor due to the flow of the solution with large viscosity.

According to an aspect of the present invention, a filter may further be included in a connection section between the continuous stirred tank reactor (CSTR) and the plug flow reactor (PFR). The filter may be made of any one or a mixture of two or more selected from the group consisting of metals, polymers and ceramics. The filter may have a pore size of 100 nm to 10 μm, preferably 100 nm to 1 μm, and is not particularly limited as long as it is a filter capable of filtering foreign substances, or the like.

According to an aspect of the present invention, the method for producing the dicyclopentadiene-based resin may perform a solvent separation process. In order to perform the solvent separation process as described above, a solvent separator may be connected to the plug flow reactor, and the solvent may be effectively discharged to recover a bulk phase dicyclopentadiene-based resin, thereby obtaining a granulated dicyclopentadiene-based resin.

According to an aspect of the present invention, in the method for producing the dicyclopentadiene-based resin, the monomer composition may be subjected to the thermal polymerization in two steps under non-catalytic and non-initiator conditions in spite of relatively short reaction time to have a high yield of 50% or more, preferably 60% or more, and more preferably 65% or more, and exhibit a narrow molecular weight distribution.

According to an aspect of the present invention, the method may further include, after the step b), a hydrogenation process. The hydrogenation may be performed according to methods known in the art to which the present invention pertains. The hydrogenation is a reaction in which hydrogen is added to an unsaturated double bond to form a single bond, and the dicyclopentadiene-based resin may be subjected to the hydrogenation to produce a hydrogenated dicyclopentadiene-based resin in which all double bonds are eliminated. As a specific example, the hydrogenation may be performed by charging the dicyclopentadiene-based resin obtained by a two-step polymerization, which is non-catalytic thermal polymerization, into a continuous hydrogenation reactor packed with a hydrogenation catalyst.

According to an aspect of the present invention, the hydrogenation may be performed at 150 to 300° C. under a pressure of 50 to 150 bar, but is not limited thereto. When the hydrogenation is performed at the pressure and temperature as described above, the molecular structure may be prevented from being destroyed.

According to an aspect of the present invention, the hydrogenation catalyst is not particularly limited, and any of the known hydrogenation catalysts may be used. Specific examples of the hydrogenation catalyst may include any one or a mixture of two or more selected from the group consisting of Ni, Fe, Cu, Co, Mo, Pd, Rh, Pt, Nb, Au, Rd and Raney Ni.

According to an aspect of the present invention, the hydrogenation catalyst may be included in an amount of 0.001 to 0.5 molar ratio, preferably 0.05 to 0.2 molar ratio based on 1 mol of the monomer of the dicyclopentadiene-based resin, for improving the reactivity, but is not limited thereto.

According to an aspect of the present invention, the dicyclopentadiene-based resin which is subjected to the hydrogenation as described above, may be used as a hot-melt adhesive, a pressure-sensitive adhesive, or the like, or may be used as an adhesive by blending with various resins such as natural rubber or synthetic rubber. The dicyclopentadiene-based resin which is subjected to the hydrogenation may also be added to ink, paint, paint for road marking, or the like as a tackifier or adhesive resin.

The dicyclopentadiene-based resin subjected to the hydrogenation may be provided as an adhesive composition by further including any one or a mixed copolymer of two or more selected from the group consisting of styrene-based copolymers such as styrene-isoprene copolymers, styrene-isoprene-styrene copolymers, styrene-butadiene copolymers, styrene-butadiene-styrene copolymers, or the like, polyolefin-based polymers such as polyethylene, polypropylene, ethylene vinyl acetate, propylene-ethylene copolymers, or the like; and any one or a mixture of two or more selected from the group consisting of synthetic waxes or animal natural waxes such as paraffin waxes, microcrystalline waxes, or the like, vegetable natural waxes, aromatic oils, naphthenic oils, and paraffinic oils in the dicyclopentadiene-based resin for use as an adhesive.

According to an aspect of the present invention, even if the thus produced hydrogenated dicyclopentadiene-based resin is made of an adhesive composition, the low molecular weight organic substance may be released to the surface, thereby preventing contamination of a bonding surface or contamination of surroundings over time.

According to an aspect of the present invention, the adhesive composition may have a softening point of 50 to 150° C., preferably 100 to 150° C., and more preferably 103 to 140° C. after curing. When the adhesive composition has the softening point as described above, adhesiveness may be improved.

According to an aspect of the present invention, the adhesive composition may have a peel strength at 180° of 0.5 kgf/25 mm or more after curing. The adhesive composition may preferably have the peel strength at 180° of 0.6 kgf/25 mm or more. Specifically, the adhesive composition may have the peel strength at 180° of 0.5 to 2.0 kgf/25 mm, and preferably 0.6 to 2.0 kgf/25 mm. In addition, the adhesive composition may have a tack force of 0.9 kgf or more, and preferably 0.95 kgf or more. The adhesive composition may specifically have a tack force of 0.9 to 1.5 kgf and preferably 0.95 to 1.5 kgf.

When the adhesive composition has physical properties as described above, an adhesive having excellent loop tack and peel properties may be provided.

The dicyclopentadiene-based resin according to the present invention may be obtained by performing the thermal polymerization on the monomer composition containing a mixed monomer of a dicyclopentadiene and a $C_2$-$C_{20}$ olefin-based monomer, or a mixed monomer of a dicyclopentadiene, a $C_2$-$C_{20}$ olefin-based monomer, and an aromatic vinyl-based monomer under non-catalytic and non-initiator conditions.

The dicyclopentadiene-based resin according to an aspect of the present invention may be produced with continuous polymerization by performing the primary thermal polymerization on the monomer composition in the continuous stirred tank reactor (CSTR), and then performing the secondary thermal polymerization on the resulting polymer in the plug flow reactor (PFR), as in the above-described production method.

The dicyclopentadiene-based resin according to an aspect of the present invention may be obtained by performing a non-catalytic thermal polymerization on dicyclopentadiene and a comonomer other than dicyclopentadiene, and may satisfy the following Equation 1. In this case, the comonomer may be a $C_2$-$C_{20}$ olefin-based monomer or a mixed monomer of a $C_2$-$C_{20}$ olefin-based monomer and an aromatic vinyl-based monomer.

$$0.1 < PDI - 1.45 \times n < 1.5 \quad \text{[Equation 1]}$$

wherein PDI is a polydispersity index of the dicyclopentadiene-based resin, and n is a weight ratio of comonomer other than dicyclopentadiene in the monomer composition (weight of comonomer other than dicyclopentadiene/weight of monomer in total monomer composition).

In Equation 1, if PDI−1.45×n is z, then the following can be satisfied: $0.1 < z < 1.5$, or $0.3 < z < 1.5$, or $0.5 < z < 1.5$, or $0.5 < z < 1.49$, or $0.8 < z < 1.49$, or $1.0 < z < 1.48$. In the case in which Equation 1 is satisfied, the molecular weight distribution may be narrow, and uniform physical properties may be implemented. In the dicyclopentadiene-based resin having same weight ratio of comonomer, the smaller the z value in Equation 1, the narrower the molecular weight distribution.

According to an aspect of the present invention, the dicyclopentadiene-based resin produced by using a method for producing non-catalytic thermal polymerization dicyclopentadiene-based resin according to the present invention, may have the polydispersity index (PDI) of 2.5 or less. Specifically, the dicyclopentadiene-based resin may have the polydispersity index of 1.0 to 2.5, preferably 1.2 to 2.4, more preferably 1.4 to 2.2, and still more preferably 1.4 to 1.8. As described above, when the thermal polymerization is performed under the non-catalytic and non-initiator conditions in two steps by using the method for producing the dicyclopentadiene-based resin according to the present invention, the molecular weight distribution may be significantly narrowed.

According to an aspect of the present invention, the dicyclopentadiene-based resin may have a number average molecular weight (Mn) of 200 to 1,200 g/mol, a weight average molecular weight (Mw) of 250 to 4,000 g/mol, and a Z-average molecular weight (Mz) of 300 to 5,000 g/mol. The dicyclopentadiene-based resin may preferably have a number average molecular weight (Mn) of 250 to 1,000 g/mol, a weight average molecular weight (Mw) of 300 to 3,000 g/mol, and a Z-average molecular weight (Mz) of 350 to 4,000 g/mol. The dicyclopentadiene-based resin may more preferably have a number average molecular weight (Mn) of 200 to 800 g/mol, a weight average molecular weight (Mw) of 300 to 3,000 g/mol, and a Z-average molecular weight (Mz) of 400 to 4,000 g/mol. In this case in which the dicyclopentadiene-based resin has the molecular weight as described above, surface contamination such as a release of low molecular weight organic substances even after the hydrogenation, may be prevented, and excellent adhesion may be exhibited.

These characteristics may cause the dicyclopentadiene-based resin to be mixed with other polymers to provide a hot-melt tackifier or an adhesive which implements excellent adhesion. In particular, since the dicyclopentadiene-based resin may function as a tackifier resin for a polymer having various physical properties, it is expected to be used in various technical fields.

Hereinafter, the present invention will be described in detail with reference to the embodiments. However, they are for the purpose of describing the present invention in more detail, but the scope of the present invention is not limited to the following Examples.

In addition, the unit of the additives may be % by weight, unless otherwise described herein.

[Measurement Method of Physical Properties]

1. Molecular Weight

The weight average molecular weight (Mw), the Z-average molecular weight (Mz), and the number average molecular weight (Mn) in terms of polystyrene were measured by gel permeation chromatography (GPC) (Infinity1260). The dicyclopentadiene-based resin to be measured was dissolved in tetrahydrofuran so as to have a concentration of 0.05 wt %, and 10 µl of the dissolved resin was injected into the GPC. The mobile phase of the GPC was injected at a flow rate of 1 mL/min using tetrahydrofuran, and analysis was performed at 35° C. One guard column was connected in series with a PL gel column (5 µm, 50 Å), a PL gel column (5 µm, 100 Å), and an oligopore column (300 Å). The molecular weight was measured at 35° C. using a refractive detector (RID) as a detector.

2. Softening Point

The softening point was measured using a ring and ball softening method (ASTM E 28). The resin was melted and put into a ring-shape mold to stand in a beaker charged with glycerin. Then, the ball was placed on a ring charged with resins and the temperature was raised by 2.5° C./min to measure a temperature (softening point) at which the resin melts and the ball drops.

Example 1

970 g of dicyclopentadiene and 30 g of piperylene were mixed in 1,000 g of a xylene solvent to prepare a monomer composition. A primary polymer was produced by reacting the monomer composition while continuously supplying the monomer composition into a continuous stirred tank reactor (CSTR) having an internal volume of 0.416 L with stirring under the conditions of a temperature of 260° C. and a pressure of 25 bar for 30 minutes.

The primary polymer thus produced was polymerized under the conditions of a temperature of 272° C. and a pressure of 25 bar for 45 minutes, while continuously supplying the primary polymer into a plug flow reactor (PFR) having an internal volume of 0.590 L connected to a continuous stirred tank reactor. A product in which polymerization was completed was depressurized at 200° C. for 30 minutes to recover a dicyclopentadiene-based resin.

Example 2

950 g of dicyclopentadiene and 50 g of piperylene were mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 30 minutes.

The primary polymer thus produced was polymerized under the conditions of a temperature of 272° C. and a pressure of 25 bar for 45 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene-based resin.

Example 3

900 g of dicyclopentadiene and 100 g of piperylene were mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 30 minutes.

The primary polymer thus produced was polymerized under the conditions of a temperature of 272° C. and a pressure of 25 bar for 45 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene-based resin.

Example 4

750 g of dicyclopentadiene, 50 g of piperylene, and 250 g of styrene were mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 34 minutes.

The primary polymer thus produced was polymerized under the conditions of a temperature of 278° C. and a pressure of 25 bar for 51 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene-based resin.

Example 5

650 g of dicyclopentadiene, 100 g of piperylene, and 250 g of styrene were mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 34 minutes.

The primary polymer thus produced was polymerized under the conditions of a temperature of 278° C. and a pressure of 25 bar for 51 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene-based resin.

Example 6

600 g of dicyclopentadiene, 150 g of piperylene, and 250 g of styrene were mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 34 minutes.

The primary polymer thus produced was polymerized under the conditions of a temperature of 278° C. and a pressure of 25 bar for 51 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene-based resin.

Example 7

600 g of dicyclopentadiene, 100 g of piperylene, and 300 g of styrene were mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 36 minutes.

The primary polymer thus produced was polymerized under the conditions of a temperature of 278° C. and a pressure of 25 bar for 54 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene-based resin.

Comparative Example 1

1,000 g of dicyclopentadiene was mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 30 minutes.

The primary polymer thus produced was polymerized under the conditions of a temperature of 272° C. and a pressure of 25 bar for 45 minutes, while continuously supplying the primary polymer into the plug flow reactor (PFR) having an internal volume of 0.590 L connected to the continuous stirred tank reactor. A product in which polymerization was completed was depressurized at 200° C. for 30 minutes to recover a dicyclopentadiene-based resin.

Comparative Example 2

1,000 g of dicyclopentadiene was mixed in 1,000 g of a xylene solvent to prepare a monomer composition. A primary polymer was produced by reacting the monomer composition while continuously supplying the monomer composition into the continuous stirred tank reactor (CSTR) having an internal volume of 0.590 L with stirring under the conditions of a temperature of 260° C. and a pressure of 25 bar for 30 minutes.

The primary polymer thus produced was polymerized under the conditions of a temperature of 272° C. and a pressure of 25 bar for 45 minutes, while continuously supplying the primary polymer into the plug flow reactor (PFR) having an internal volume of 0.590 L connected to the continuous stirred tank reactor. A product in which polymerization was completed was depressurized at 200° C. for 30 minutes to recover a dicyclopentadiene-based resin.

Comparative Example 3

1,000 g of dicyclopentadiene was mixed in 1,000 g of a xylene solvent to prepare a monomer composition. A primary polymer was produced by reacting the monomer composition while continuously supplying the monomer composition into the continuous stirred tank reactor (CSTR) having an internal volume of 0.416 L with stirring under the conditions of a temperature of 260° C. and a pressure of 25 bar for 30 minutes.

The primary polymer thus produced was polymerized under the conditions of a temperature of 272° C. and a pressure of 25 bar for 45 minutes, while continuously supplying the primary polymer into the continuous stirred tank reactor (CSTR) having an internal volume of 0.416 L. A product in which polymerization was completed was depressurized at 200° C. for 30 minutes to recover a dicyclopentadiene-based resin.

Comparative Example 4

750 g of dicyclopentadiene and 250 g of styrene were mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 34 minutes.

The primary polymer thus produced was polymerized under the conditions of a temperature of 278° C. and a pressure of 25 bar for 51 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene-based resin.

Comparative Example 5

700 g of dicyclopentadiene and 300 g of styrene were mixed in 1,000 g of a xylene solvent to prepare a monomer composition. A primary polymer was produced by reacting the monomer composition while continuously supplying the monomer composition into the continuous stirred tank reactor having an internal volume of 0.416 L with stirring under the conditions of a temperature of 260° C. and a pressure of 25 bar for 34 minutes.

The primary polymer thus produced was polymerized under the conditions of a temperature of 278° C. and a pressure of 25 bar for 51 minutes, while continuously supplying the primary polymer into the plug flow reactor having an internal volume of 0.590 L connected to the continuous stirred tank reactor. A product in which polymerization was completed was depressurized at 200° C. for 30 minutes to recover a dicyclopentadiene-based resin.

The reaction conditions of the Examples and Comparative Examples are shown in the following Table 1.

TABLE 1

|  | Reaction condition of first step | | Reaction condition of second step | | Weight ratio (n) of comonomer |
|---|---|---|---|---|---|
|  | Reactor | Reaction temperature and time | Reactor | Reaction temperature and time |  |
| Example 1 | CSTR | 260° C., 30 min | PFR | 272° C., 45 min | 0.03 |
| Example 2 | CSTR | 260° C., 30 min | PFR | 272° C., 45 min | 0.05 |
| Example 3 | CSTR | 260° C., 30 min | PFR | 272° C., 45 min | 0.10 |
| Example 4 | CSTR | 260° C., 34 min | PFR | 278° C., 51 min | 0.30 |
| Example 5 | CSTR | 260 ° C., 34 min | PFR | 278° C., 51 min | 0.35 |
| Example 6 | CSTR | 260° C., 34 min | PFR | 278° C., 51 min | 0.40 |
| Example 7 | CSTR | 260° C., 36 min | PFR | 278° C., 54 min | 0.40 |
| Comparative Example 1 | CSTR | 260° C., 30 min | PFR | 272° C., 45 min | — |
| Comparative Example 2 | PFR | 260° C., 30 min | PFR | 272° C., 45 min | — |
| Comparative Example 3 | CSTR | 260° C., 30 min | CSTR | 272° C., 45 min | — |
| Comparative Example 4 | CSTR | 260 ° C., 34 min | PFR | 278° C., 51 min | 0.25 |
| Comparative Example 5 | CSTR | 260° C., 36 min | PFR | 278° C., 54 min | 0.30 |

Experimental Example

The molecular weights (Mn, Mw, Mz) and the polydispersity index (PDI, Mw/Mn) of the dicyclopentadiene-based resin produced from the Examples and the Comparative Examples were measured and are shown in the following Table 2.

TABLE 2

|  | Mw (g/mol) | Mn (g/mol) | Mz (g/mol) | PDI | Weight ratio (n) of co-monomer | PDI-1.45 × n | Yield (%) |
|---|---|---|---|---|---|---|---|
| Example 1 | 484 | 318 | 3557 | 1.52 | 0.03 | 1.477 | 65 |
| Example 2 | 494 | 320 | 3353 | 1.54 | 0.05 | 1.458 | 63 |
| Example 3 | 493 | 318 | 3388 | 1.55 | 0.10 | 1.405 | 61 |
| Example 4 | 650 | 406 | 1363 | 1.60 | 0.30 | 1.165 | 60 |
| Example 5 | 686 | 426 | 1474 | 1.61 | 0.35 | 1.103 | 61 |
| Example 6 | 713 | 437 | 1537 | 1.63 | 0.40 | 1.050 | 58 |
| Example 7 | 753 | 461 | 1625 | 1.63 | 0.40 | 1.050 | 65 |
| Comparative Example 1 | 475 | 269 | 3762 | 1.76 | — | — | 55 |
| Comparative Example 2 | 537 | 285 | 3875 | 1.88 | — | — | 54 |
| Comparative Example 3 | 521 | 280 | 3672 | 1.86 | — | — | 52 |
| Comparative Example 4 | 645 | 343 | 1371 | 1.88 | 0.25 | 1.518 | 56 |
| Comparative Example 5 | 712 | 365 | 1502 | 1.95 | 0.30 | 1.515 | 50 |

As shown in Table 2, it was confirmed that the dicyclopentadiene-based resin according to the Examples of the present invention has a high yield and a narrow molecular weight distribution as compared to the Comparative Examples.

Furthermore, for Comparative Examples 2 and 3, it was confirmed that the molecular weight distribution was broad and the yield was low by setting the reactor configurations in the primary and secondary polymerization to be the same. Thus, it was confirmed that the reactor was configured differently during the primary and secondary polymerization, and during the primary polymerization, the polymerization was performed while stirring in the continuous stirred tank reactor and during the secondary polymerization, the polymerization was performed in the plug flow reactor, thereby implementing an excellent yield and narrow molecular weight distribution of the dicyclopentadiene-based resin.

Moreover, it was confirmed that the dicyclopentadiene-based resin produced by a production method according to the embodiment of the present invention may be subjected to the thermal polymerization under the non-catalytic conditions, thereby having the narrow molecular weight distribution and implementing uniform physical properties.

Example 8

The hydrogenation was performed twice under the conditions of a temperature of 260° C. and a pressure of 100 bar using 0.5 wt % of palladium catalyst based on the total weight of the dicyclopentadiene-based resin in Example 1 and 4 NL/min of hydrogen.

Comparative Example 6

The dicyclopentadiene-based resin in Comparative Example 1 was subjected to the hydrogenation in the same manner as in Example 8.

Comparative Example 7

The dicyclopentadiene-based resin in Comparative Example 2 was subjected to the hydrogenation in the same manner as in Example 8.

Comparative Example 8

The dicyclopentadiene-based resin in Comparative Example 3 was subjected to the hydrogenation in the same manner as in Example 8.

In order to evaluate adhesion of the dicyclopentadiene based hydrogenated resin produced from Example 8, and Comparative Examples 6, 7, and 8, the adhesive composition was produced by adding 25 parts by weight of styrene-butadiene-styrene copolymers, 57 parts by weight of a dicyclopentadiene based hydrogenated resin, 18 parts by weight of a paraffin oil plasticizer, and 0.5 parts by weight of an antioxidant.

The adhesive composition thus produced was applied to a 100 μm PET film whose cross section was corona treated at a wet thickness of 36 μm using an automatic film applicator. The applied film was dried at 100° C. for 30 minutes to remove the solvent, and a peel strength at 180° and a loop tack test were measured using an FT-1 universal material testing machine (manufactured by LLOYD). The results are shown in Table 3.

TABLE 3

| | Peel strength at 180° (kgf/25 mm) | Tack force (kgf) | Softening point (° C.) |
|---|---|---|---|
| Example 8 | 0.72 | 1.08 | 103 |
| Comparative Example 6 | 0.48 | 0.96 | 106 |
| Comparative Example 7 | 0.44 | 0.90 | 103 |
| Comparative Example 8 | 0.42 | 0.91 | 104 |

As shown in Table 3, it was confirmed that the dicyclopentadiene based hydrogenated resin in Example 8 has a significantly improved peel strength and a tack force as compared to the hydrogenated resin produced as the Comparative Examples, thereby having excellent adhesion.

In addition, it was confirmed that the dicyclopentadiene based hydrogenated resin in Example 8 did not cause contamination of the bonding surface or contamination of surrounding devices, even with an increase in implementation with long-term use, and thus exhibited excellent adhesion and holding ability over a long period of time.

The present invention described above is only an example, and it may be appreciated by those skilled in the art to which the present invention pertains that various modifications and equivalent other exemplary embodiments may be made from the exemplary embodiment. It may be thus understood well that the present invention is not limited to only a form mentioned in the above detailed description. Accordingly, the true scope of technical protection of the present invention is to be determined by the technical spirit of the appended claims.

Therefore, the spirit of the present invention should not be limited to these exemplary embodiments, but the claims and all of the modifications equal or equivalent to the claims are intended to fall within the scopes and spirits of the present invention.

The invention claimed is:

1. A method for producing a dicyclopentadiene-based resin, the method comprising:
    a) a primary thermal polymerization step of thermally polymerizing a monomer composition in a continuous stirred tank reactor (CSTR) under non-catalytic conditions, the monomer composition containing a mixed monomer of dicyclopentadiene and a $C_2$-$C_{20}$ olefin-based monomer, or a mixed monomer of dicyclopentadiene, a $C_2$-$C_{20}$ olefin-based monomer, and an aromatic vinyl-based monomer; and
    b) a secondary thermal polymerization step of thermally polymerizing a reaction product obtained by the primary thermal polymerization in a plug flow reactor (PFR) under non-catalytic conditions.

2. The method of claim 1, wherein the mixed monomer of the dicyclopentadiene and the $C_2$-$C_{20}$ olefin-based monomer includes the dicyclopentadiene and the $C_2$-$C_{20}$ olefin-based monomer in a weight ratio of 50:50 to 99:1.

3. The method of claim 1, wherein the olefin-based monomer is any one or a mixture of two or more selected from the group consisting of piperylene, isoprene, ethylene, propylene, 1-butene, 1-pentene, 1-hexene, 1-heptene, 1-octene, 1-decene, 1-undecene, 1-dodecene, 1-tetradecene, 1-hexadecene, and mixed C5 fractions.

4. The method of claim 1, wherein the aromatic vinyl-based monomer is any one or a mixture of two or more selected from the group consisting of styrene, alpha-methylstyrene, para-methylstyrene, indene, methyl indene, vinyltoluene, mixed C9 fractions, and derivatives thereof.

5. The method of claim 1, wherein
    a reaction temperature ($T_1$) in the step a) is 210 to 270° C., and
    a reaction temperature ($T_2$) in the step b) is 180 to 300° C.

6. The method of claim 1, wherein
    a reaction time in the step a) is 10 to 180 minutes, and
    a reaction time in the step b) is 10 to 360 minutes.

7. The method of claim 1, wherein the dicyclopentadiene-based resin has a polydispersity index (PDI) of 2.5 or less.

8. The method of claim 1, further comprising, after the step b), performing a hydrogenation process.

9. The method of claim 1, wherein the dicyclopentadiene-based resin has a number average molecular weight of 200 to 1,200 g/mol, a weight average molecular weight of 250 to 4,000 g/mol, and a Z-average molecular weight (Mz) of 300 to 5,000 g/mol.

* * * * *